United States Patent
Manabe et al.

(10) Patent No.: US 8,263,275 B2
(45) Date of Patent: Sep. 11, 2012

(54) FUEL CELL SYSTEM HAVING A CONTROL UNIT FOR MEASURING IMPEDANCE

(75) Inventors: Kota Manabe, Toyota (JP); Masahiro Shige, Kaizuka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1242 days.

(21) Appl. No.: 11/922,875

(22) PCT Filed: Jun. 30, 2006

(86) PCT No.: PCT/JP2006/313533
§ 371 (c)(1),
(2), (4) Date: Dec. 26, 2007

(87) PCT Pub. No.: WO2007/004718
PCT Pub. Date: Jan. 11, 2007

(65) Prior Publication Data
US 2009/0117427 A1    May 7, 2009

(30) Foreign Application Priority Data
Jun. 30, 2005   (JP) .................................. 2005-191363

(51) Int. Cl.
*H01M 8/04* (2006.01)
*G01R 27/02* (2006.01)
*G01R 25/00* (2006.01)

(52) U.S. Cl. ........................... 429/428; 324/602; 402/65

(58) Field of Classification Search .................. 429/428, 429/430–432; 324/600, 602, 605; 702/64, 702/65

See application file for complete search history.

(56) References Cited

U.S. PATENT DOCUMENTS

| 6,376,111 | B1 | 4/2002 | Mathias et al. |
| 2002/0038732 | A1* | 4/2002 | Sugiura et al. ............... 180/65.2 |
| 2003/0231518 | A1* | 12/2003 | Peng .............................. 363/98 |
| 2005/0287402 | A1* | 12/2005 | Maly et al. ...................... 429/13 |
| 2006/0074574 | A1* | 4/2006 | Gasda et al. .................... 702/63 |
| 2007/0139027 | A1 | 6/2007 | Nishimori |

FOREIGN PATENT DOCUMENTS

| EP | 1 322 029 A1 | 6/2003 |
| JP | 01157265 A * | 6/1989 |
| JP | 7-235324 A | 9/1995 |
| JP | 2002-367650 A | 12/2002 |
| JP | 2003-14796 A | 1/2003 |
| JP | 2003-86220 A | 3/2003 |
| JP | 2005-180927 A | 7/2005 |
| WO | 03/010877 A1 | 2/2003 |
| WO | WO 03010877 A1 * | 2/2003 |

* cited by examiner

*Primary Examiner* — Barbara Gilliam
*Assistant Examiner* — Edu E Enin-Okut
(74) *Attorney, Agent, or Firm* — Kenyon & Kenyon LLP

(57) ABSTRACT

There is provided a fuel cell system in which a constantly accurate impedance measurement is made possible regardless of a response characteristic of the voltage converting device. A superimposed signal analysis section analyzes an impedance measuring signal after passing through a DC/DC converter to thereby notify a superimposed signal amplitude control section of an analysis result. A superimposed signal amplitude control section controls an amplitude value of the impedance measuring signal generated by a superimposed signal generating section based on the result notified from the superimposed signal analysis section.

2 Claims, 9 Drawing Sheets

FUEL CELL SYSTEM HAVING A CONTROL UNIT FOR MEASURING IMPEDANCE

This is a 371 national phase application of PCT/JP2006/313533 filed 30 Jun. 2006, which claims priority of Japanese Patent Application No. 2005-191363 filed 30 Jun. 2005, the contents of which are incorporated herein by reference.

TECHNICAL FIELD

The present invention relates to a fuel cell system, more particularly to a fuel cell system in which an impedance measurement is performed by using an AC impedance method.

BACKGROUND ART

It is known that the internal resistance of a fuel cell influences humidity coefficient of an electrolytic film in the fuel cell, and when a small amount of the moisture is present in the fuel cell and the electrolytic film is relatively dry, the internal resistance increases and the output voltage of the fuel cell decreases. On the other hand, when an excessive amount of the moisture is present in the fuel cell, the electrode of the fuel cell is covered with the moisture, and in consequence, diffusion of oxygen and hydrogen as reactants is inhibited, and thus the output voltage decreases.

To operate the fuel cell with a high efficiency, the amount of the moisture in the fuel cell needs to be controlled in an optimum manner. There is a correlation between the amount of the moisture in the fuel cell and the impedance of the fuel cell. At present, the impedance of the fuel cell is measured by an AC impedance method, whereby the moisture status in the fuel cell is indirectly grasped.

For example, in Patent Document 1 described hereinafter, a method is disclosed in which a sinusoidal signal (impedance measuring signal) having an arbitrary frequency is applied to (superimposed on) an output signal of the fuel cell to measure the impedance in this case, whereby the amount of the moisture in the fuel cell is grasped in real time.

[Patent Document 1] Japanese Patent Application Laid-Open No. 2003-86220

DISCLOSURE OF THE INVENTION

In a mobile apparatus (e.g., a vehicle) on which a fuel cell is mounted, to maximize a general system efficiency, the fuel cell is connected to a secondary cell (electric accumulating device) via a DC/DC converter (voltage converting device), and a control is performed to supply a current from the secondary cell side to the fuel cell side in accordance with a required power of the vehicle or conversely charge the secondary cell side from the fuel cell side. In the system having this constitution, the above-described arbitrary sinusoidal signal can be superimposed by using the DC/DC converter to thereby measure an impedance.

However, a response characteristic of the DC/DC converter is not always satisfactory, and there also exists a region having a poor response characteristic (details will be described later). On such conditions, an impedance measuring signal cannot sufficiently be superimposed. Therefore, there has been a problem that the impedance measurement cannot sufficiently be performed.

The present invention has been developed in view of the above-described situations, and an object thereof is to provide a fuel cell system in which a constantly accurate impedance measurement is possible regardless of a response characteristic of the voltage converting device.

To solve the above-described problem, a fuel cell system of the present invention includes a fuel cell and a voltage converting device for controlling an output voltage of the fuel cell. The fuel cell system comprises output means for superimposing an impedance measuring signal on an output target voltage of the voltage converting device and outputting the voltage to the voltage converting device, when an impedance of the fuel cell is measured; measurement means for measuring an amplitude of the impedance measuring signal after passing through the voltage converting device; and control means for controlling an amplitude of the impedance measuring signal before passing through the voltage converting device based on a measurement result of the measurement means.

According to this constitution, since a value of the amplitude of the impedance measuring signal after passing through the voltage converting device is measured, and the value of the amplitude of the impedance measuring signal before passing through the voltage converting device is controlled based on the measurement result of the value of the amplitude, a constantly accurate impedance measurement is possible regardless of a response characteristic of the voltage converting device (DC/DC converter).

Here, in the above constitution, the present invention may be configured so that the system further includes an electric accumulator interposed in a discharge path of the fuel cell and connected in parallel to the fuel cell, the voltage converting device is connected between the electric accumulator and the fuel cell, and the output means superimposes the impedance measuring signal on the output target voltage of the voltage converting device to output the voltage to the voltage converting device, when the impedance of the fuel cell is measured by using an AC impedance method.

Moreover, in the above constitution, the present invention may be configured so that the control means may obtain a deviation between an amplitude value measured by the measurement means and a set target amplitude value, and control the amplitude of the impedance measuring signal based on the obtained deviation.

Furthermore, a fuel cell system of the present invention includes a fuel cell and a voltage converting device for controlling an output voltage of the fuel cell. The fuel cell system comprises output means for superimposing an impedance measuring signal on an output target voltage of the voltage converting device and outputting the voltage to the voltage converting device, when an impedance of the fuel cell is measured; judgment means for judging a state of a response characteristic of the voltage converting device during the impedance measurement; and control means for controlling an amplitude of the impedance measuring signal based on the state of the response characteristic of the voltage converting device judged by the judgment means.

Here, in the above constitution, the present invention may be configured so that the system further includes a electric accumulator interposed in a discharge path of the fuel cell and connected in parallel to the fuel cell, the voltage converting device is connected between the electric accumulator and the fuel cell, and the output means superimposes the impedance measuring signal on the output target voltage of the voltage converting device and outputs the voltage to the voltage converting device, when the impedance of the fuel cell is measured by using an AC impedance method.

Moreover, in the above constitution, it is preferable that the system further comprises measurement means for measuring a reactor current of the voltage converting device; and first storage means for storing a response characteristic map to judge from the reactor current of the voltage converting device whether or not the response characteristic of the voltage converting device is in a stable state. The judgment means compares a measurement result of the measurement means with the response characteristic map to judge the stable state of the response characteristic, and the control means performs a control so that the amplitude of the impedance measuring signal, when the response characteristic of the voltage converting device is in an unstable state is larger than that of the impedance measuring signal in a case where the response characteristic of the voltage converting device is in the stable state.

It is also preferable that the system further comprises second storage means for storing an amplitude value of the impedance measuring signal in a case where the response characteristic is in the stable state and an amplitude value of the impedance measuring signal in a case where the response characteristic is in the unstable state. The control means selects, from the second storage means, the amplitude value of the impedance measuring signal in accordance with the state of the voltage converting device, and controls the amplitude of the impedance measuring signal based on the selected amplitude value.

Moreover, a fuel cell system of the present invention includes a fuel cell and a voltage converting device for controlling an output voltage of the fuel cell. The fuel cell system further comprises output means for superimposing an impedance measuring signal on an output target voltage of the voltage converting device and outputting the voltage to the voltage converting device, when an impedance of the fuel cell is measured; and judgment means for judging a state of a response characteristic of the voltage converting device. The output means superimposes the impedance measuring signal on the output target voltage of the voltage converting device and outputting the voltage to the voltage converting device in a case where the judgment means judges that the response characteristic of the voltage converting device is in a stable state.

Here, in the above constitution, the present invention may be configured so that the system further includes an electric accumulator interposed in a discharge path of the fuel cell and connected in parallel to the fuel cell, the voltage converting device is connected between the electric accumulator and the fuel cell, and the output means superimposes the impedance measuring signal on the output target voltage of the voltage converting device and outputting the voltage to the voltage converting device, when the impedance of the fuel cell is measured by using an AC impedance method.

Moreover, in the above constitution, it is preferable that the system further comprises measurement means for measuring a reactor current of the voltage converting device; and first storage means for storing a response characteristic map to judge from the reactor current of the voltage converting device whether the response characteristic of the voltage converting device is in a stable state or an unstable state. The judgment means compares a measurement result of the measurement means with the response characteristic map to judge whether the response characteristic is in the stable state or the unstable state.

Furthermore, it is more preferable that the system further comprises state control means for changing the output target voltage of the voltage converting device to thereby change the response characteristic from the unstable state to the stable state in a case where the judgment means judges that the response characteristic is in the unstable state.

In the above constitutions, the "stable state" refers to a state in which, for example, a voltage control response of the voltage converting device (DC/DC converter or the like) is not influenced by a dead time of a switching element, and is satisfactory. The "unstable state" refers to a state in which, for example, the voltage control response of the voltage converting device (DC/DC converter or the like) is influenced by the dead time of the switching element, and is deteriorated.

As described above, according to the present invention, a constantly accurate impedance measurement is possible regardless of the response characteristic of the voltage converting device.

BEST MODE FOR CARRYING OUT THE INVENTION

Embodiments of the present invention will be described hereinafter with reference to the drawings.

A. First Embodiment

Figure 1:
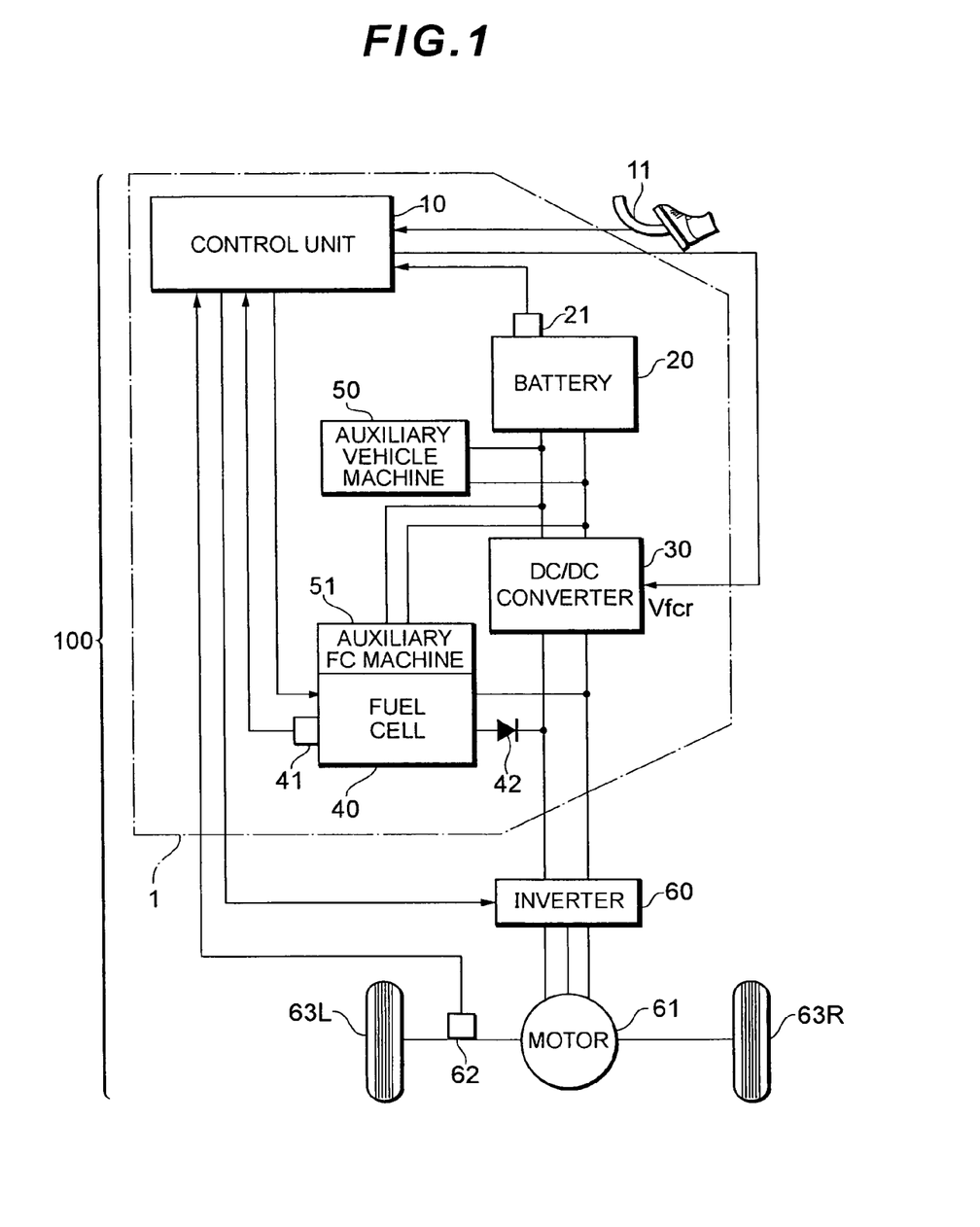
FIG. 1 is a diagram showing a constitution of a fuel cell system in a first embodiment.

FIG. 1 shows a schematic constitution of a vehicle on which a fuel cell system 100 of a first embodiment is mounted. It is to be noted that in the following description, as one example of the vehicle, a fuel cell hybrid vehicle (FCHV) is assumed, but the system is applicable to an electric car or a hybrid car. The system is also applicable to not only the vehicle but also various mobile apparatuses (e.g., a boat, an airplane, etc.).

This vehicle travels, using a synchronous motor 61 connected to wheels 63L, 63R. A power source of the synchronous motor 61 is a power source system 1. A direct current output from the power source system 1 is converted into a three-phase alternating current by an inverter 60, and supplied to the synchronous motor 61. The synchronous motor 61 can also function as a power generator during braking.

The power source system 1 is constituted of a fuel cell 40, a battery 20, a DC/DC converter 30 and the like. The fuel cell 40 is means for generating a power from a supplied fuel gas and an oxidation gas, and has a stacked structure in which a plurality of single cells including an MEA and the like are laminated in series. Specifically, there can be used fuel cells of various types such as a solid polymer type, a phosphoric type and a dissolved carbonate type.

The battery (electric accumulator) 20 is a chargeable/dischargeable secondary cell, and constituted of, for example, a nickel hydrogen battery and the like. Various other secondary cells can be applied. Instead of the battery 20, there may be used a chargeable/dischargeable electric accumulator other than the secondary cell, for example, a capacitor. This battery 20 is interposed in a discharge path of the fuel cell 40, and connected in parallel to the fuel cell 40.

The fuel cell 40 and the battery 20 are connected to the inverter 60 in parallel to each other, and a circuit from the fuel cell 40 to the inverter 60 is provided with a diode 42 for preventing reverse flow of a current from the battery 20 or a current generated in the synchronous motor 61.

Thus, in order to realize an appropriate output distribution of both power sources of the fuel cell 40 and the battery 20 connected in parallel to each other, a relative voltage difference between the power sources needs to be controlled. In the present embodiment, in order to control such a voltage difference, the DC/DC converter (voltage converting device) 30 is disposed between the battery 20 and the inverter 60. The DC/DC converter 30 is a direct-current voltage converting device, and has a function of adjusting the DC voltage inputted from the battery 20 and outputting the voltage to the fuel cell 40 side, and a function of adjusting the DC voltage inputted from the fuel cell 40 or the motor 61 and outputting the voltage to the battery 20 side. The charge/discharge of the battery 20 is realized by the functions of this DC/DC converter 30.

A vehicle auxiliary machine 50 and an FC auxiliary machine 51 are connected between the battery 20 and the DC/DC converter 30, and the battery 20 is a power source of these auxiliary machines. The vehicle auxiliary machine 50 refers to any type of electric device for use during the operation of the vehicle, and includes an illumination device, an air conditioning device, a hydraulic pump or the like. The FC auxiliary machine 51 refers to any type of electric device for use in the operation of the fuel cell 40, and includes a pump for supplying a fuel gas or a reformed material, a heater to adjust temperature of a reformer or the like.

The operations of the above-described elements are controlled by a control unit 10. The control unit 10 is constituted as a microcomputer including therein a CPU, a RAM and a ROM. The control unit 10 controls switching of the inverter 60, and outputs the three-phase alternating current in accordance with a required mobile power. The control unit 10 controls the operations of the fuel cell 40 and the DC/DC converter 30 so that the electric power is supplied in accordance with the required mobile power. Various sensor signals are inputted into the control unit 10. The various sensor signals are inputted into the control unit 10 from, for example, an acceleration pedal sensor 11, an SOC sensor 21 which detects a state of charge (SOC) of the battery 20, a flow rate sensor 41 which detects a gas flow rate of the fuel cell 40, a vehicle speed sensor 62 which detects a vehicle speed and the like.

Figure 2:
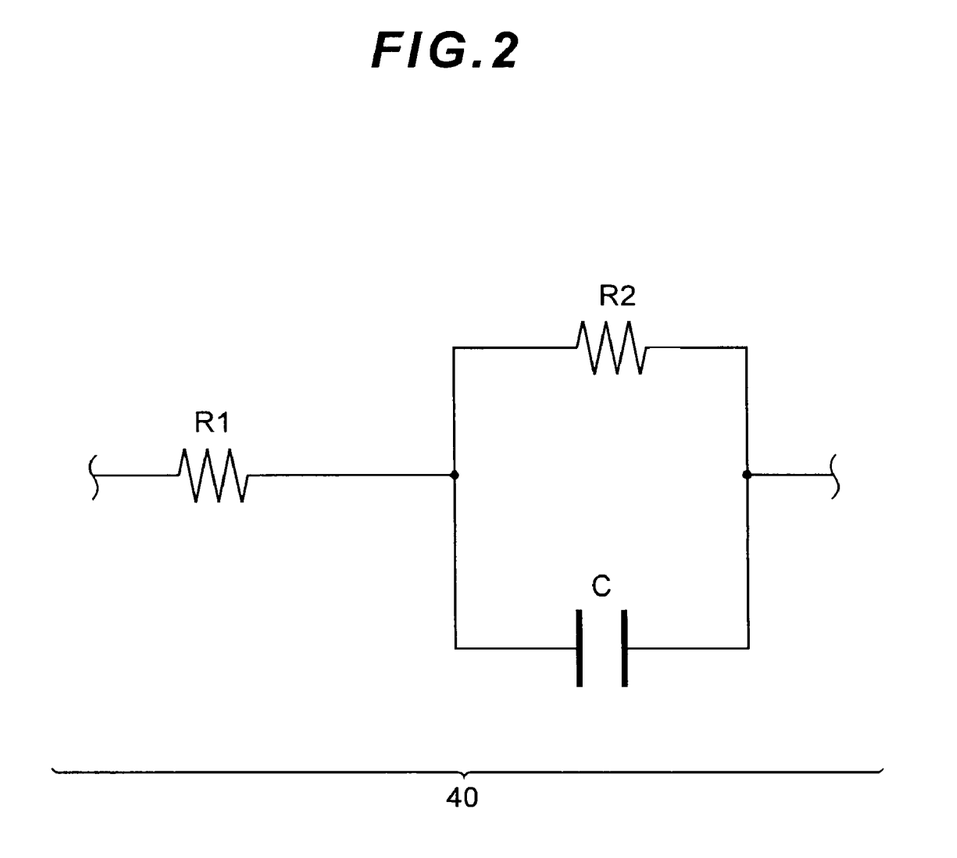
FIG. 2 is an equivalent circuit diagram of the fuel cell in the first embodiment.

FIG. 2 is a diagram showing an equivalent circuit of the fuel cell 40.

As shown in FIG. 2, the fuel cell 40 is represented by a separator resistance R1, an MEA resistance R2 and an electrode capacitance C. These resistances R1, R2 and the capacitance C form an internal impedance of the fuel cell 40. When an impedance measurement is performed as described below, inner characteristics of the fuel cell are grasped.

Figure 3:
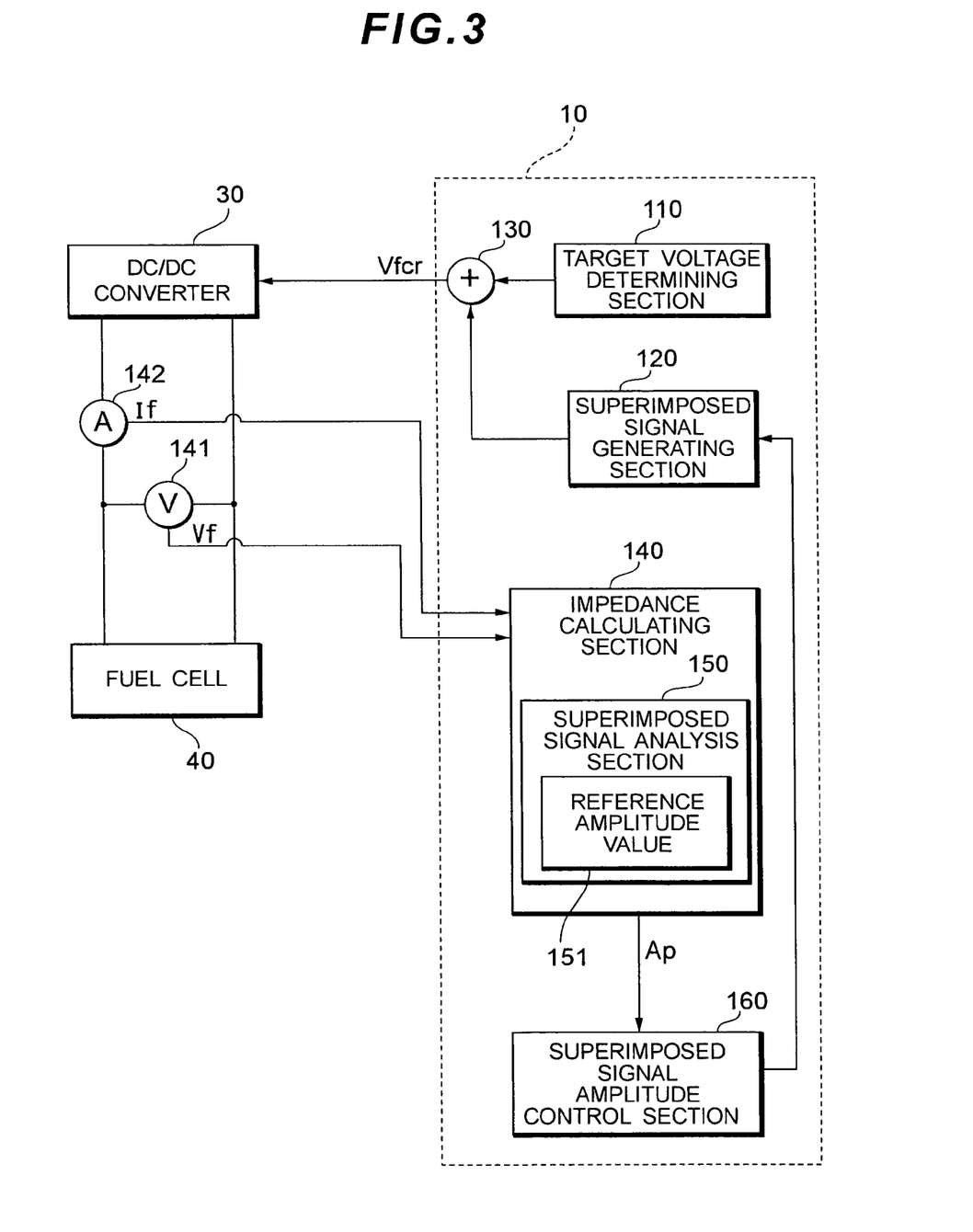
FIG. 3 is a diagram showing the impedance measurement in the first embodiment.

FIG. 3 is a diagram showing the impedance measurement by an AC impedance method.

As shown in FIG. 3, the control unit 10 includes a target voltage determining section 110, a superimposed signal generating section 120, a voltage instruction signal generating section 130, an impedance calculating section 140, a superimposed signal analysis section 150 and a superimposed signal amplitude control section 160.

The target voltage determining section 110 determines an output target voltage (e.g., 300 V or the like) based on the sensor signals inputted from the acceleration pedal sensor 11, the SOC sensor 21 and the like, and outputs this voltage to the voltage instruction signal generating section 130.

The superimposed signal generating section 120 generates an impedance measuring signal (e.g., a sine wave of a specific frequency having an amplitude value of 2 V or the like) to be superimposed on the output target voltage, and outputs this signal to the voltage instruction signal generating section 130. This amplitude value of the impedance measuring signal is appropriately changed (e.g., the amplitude value 2 V→4 V or the like) by the superimposed signal amplitude control section 160. It is to be noted that the output target voltage and parameters (waveform type, frequency and amplitude value) of the impedance measuring signal may appropriately be set in accordance with system design and the like.

The voltage instruction signal generating section (output means) 130 superimposes the impedance measuring signal on the output target voltage, and outputs a voltage instruction signal Vfcr to the DC/DC converter 30. The DC/DC converter 30 controls the voltage of the fuel cell 30 or the like based on the given voltage instruction signal Vfcr.

The impedance calculating section 140 samples a voltage (FC voltage) Vf of the fuel cell 40 detected by a voltage sensor 141 and a current (FC current) If of the fuel cell 40 detected by a current sensor 142 at a predetermined sampling rate, and subjects them to Fourier transform processing (FFT calculation processing or DFT calculation processing) or the like. The impedance calculating section 140 divides the FC voltage signal subjected to the Fourier transform processing by the FC current signal subjected to the Fourier transform processing to obtain the impedance of the fuel cell 40.

The superimposed signal analysis section (measurement means) 150 analyzes the impedance measuring signal (i.e., the impedance measuring signal passing through the DC/DC converter) superimposed on the FC voltage or the FC current, and compares a power spectrum (amplitude value) of the specific frequency with a reference spectrum (e.g., 2 V or the like; reference amplitude value) stored in a memory 151 to grasp a response characteristic of the DC/DC converter 30.

As described above, in the DC/DC converter 30, there exist a region having a satisfactory response characteristic and a region having a poor response characteristic. The amplitude value of the specific frequency is not less than the reference amplitude value in the region having the satisfactory response, whereas the amplitude value of the specific frequency is below the reference amplitude value in the region having the poor response.

The superimposed signal analysis section 150 notifies the superimposed signal amplitude control section 160 of nothing, when the amplitude value of the specific frequency of the superimposed signal is not less than the reference amplitude value. On the other hand, when the amplitude value of the specific frequency is below the reference amplitude value, the superimposed signal analysis section 150 obtains a deviation (difference) Ap between the amplitude value of the specific frequency and the reference amplitude value, and notifies the superimposed signal amplitude control section 160 of the obtained deviation Ap.

The superimposed signal amplitude control section (control means) 160 controls the amplitude value of the impedance measuring signal (i.e., the impedance measuring signal before passing through the DC/DC converter) generated in the superimposed signal generating section 120. For example, in a case where the deviation Ap of 2 V is notified by the superimposed signal analysis section 150 in a state in which the amplitude value of the impedance measuring signal is set to 2 V, the superimposed signal amplitude control section 160 performs a control to change the amplitude value for an AC impedance measurement from 2 V to 4 V so that the amplitude of the specific frequency is above the reference amplitude value.

Thus, by changing the amplitude value of the impedance measuring signal based on the analysis result obtained by the superimposed signal analysis section 150, a constantly accurate impedance measurement is possible regardless of the response characteristic of the DC/DC converter 30.

B. Second Embodiment

In the above first embodiment, the amplitude value of a specific frequency of the impedance is monitored, and the amplitude of the impedance measuring signal is controlled based on the deviation Ap between the amplitude value and the reference amplitude value, but a map in which a reactor current (described later) of the DC/DC converter 30 is associated with a response characteristic (hereinafter, referred to as a response characteristic map) may be prepared and stored, and the amplitude of the impedance measuring signal may be controlled by using the response characteristic map.

Figure 4:
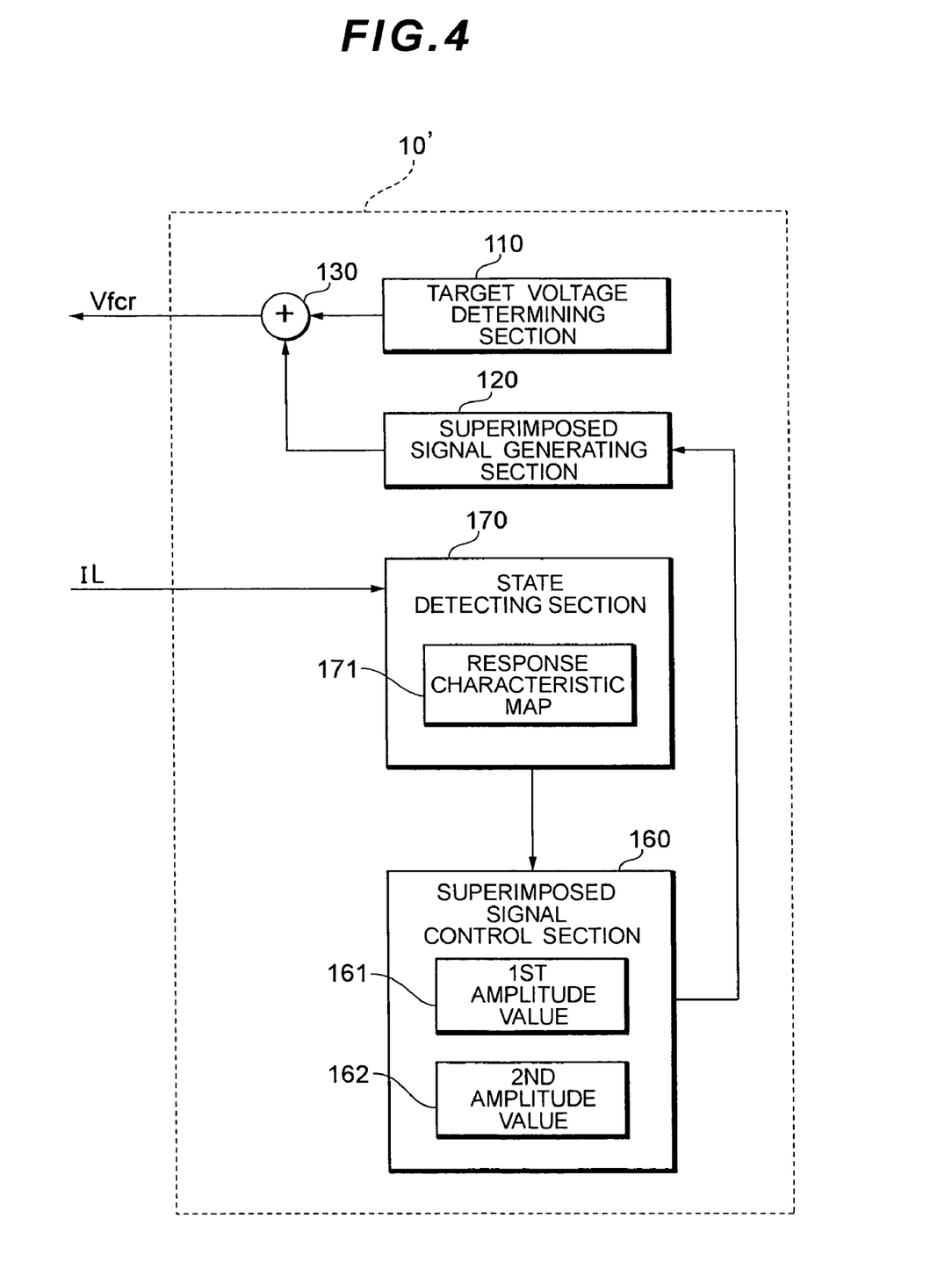
FIG. 4 is a diagram showing an impedance measurement in a second embodiment.

FIG. 4 is a diagram showing a constitution of functions of a control unit 10' in the second embodiment. It is to be noted that in the control unit 10' shown in FIG. 4, components corresponding to those of FIG. 3 are denoted with the same reference numerals, and detailed description thereof is omitted.

A state detecting section (judgment means) 170 compares a reactor current IL of the DC/DC converter 30 with the response characteristic map stored in a memory (first storage means) 171 to thereby grasp a state (a stable state or an unstable state) of the response characteristic of the DC/DC converter 30, and notifies the superimposed signal amplitude control section 160 of a grasped result (details will be described later).

In a case where the superimposed signal control section (control means) 160 is notified by the state detecting section 170 that the response characteristic is in the stable state, the control section selects a first amplitude value fr1 stored in a first memory (second storage means) 161, and controls the impedance measuring signal so that the amplitude value of the signal is the first amplitude value fr1.

On the other hand, in a case where the superimposed signal control section 160 is notified by the state detecting section 170 that the response characteristic is in the unstable state, the control section selects a second amplitude value fr2 (>fr1) which is larger than the first amplitude value and which is stored in a second memory (third storage means) 162, and controls the impedance measuring signal so that the amplitude value of the signal is the second amplitude value fr2.

Thus, when the state of the response characteristic of the DC/DC converter 30 is grasped from the reactor current IL and the response characteristic map, and the amplitude value of the impedance measuring signal is changed based on such a state, a constantly accurate impedance measurement is possible regardless of the response characteristic of the DC/DC converter 30.

There will be described hereinafter in detail the states of the response characteristic of the DC/DC converter 30.

Figure 5:
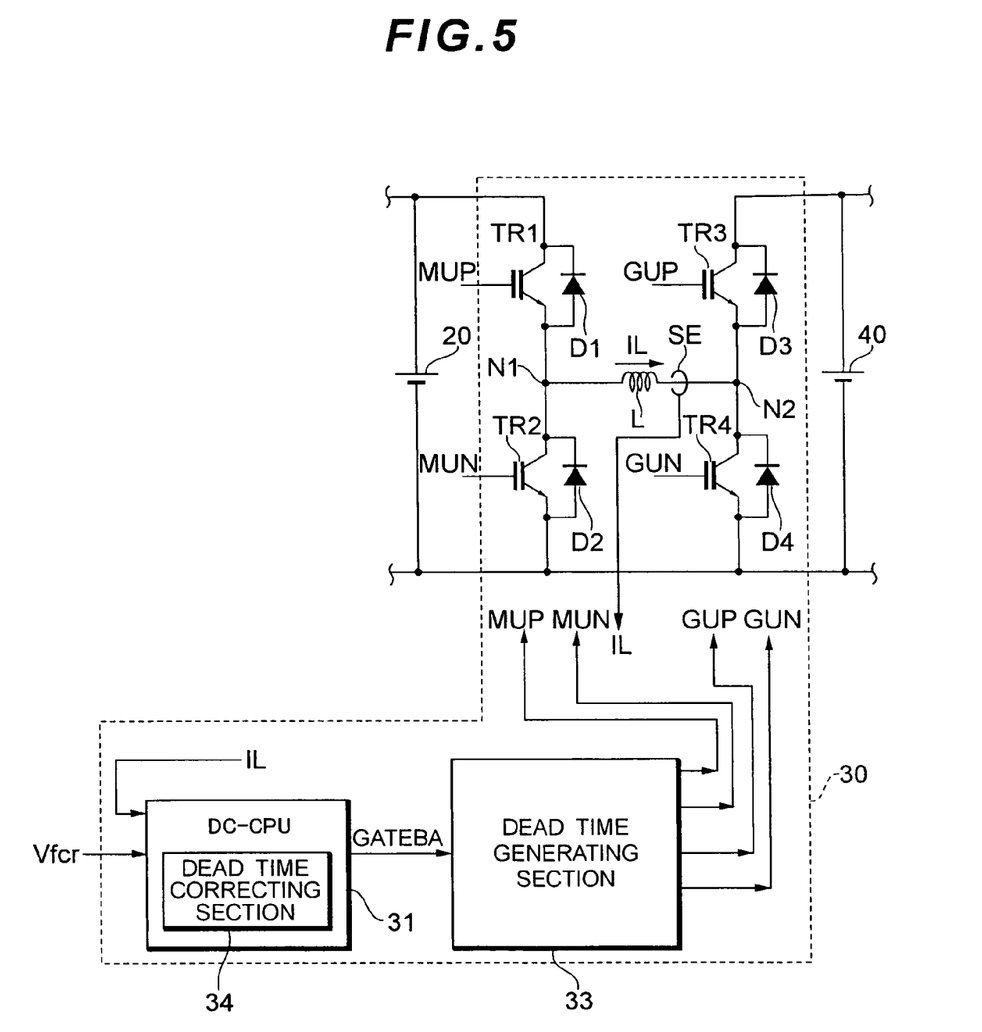
FIG. 5 is a circuit diagram showing a constitution of the DC/DC converter in the second embodiment.

FIG. 5 is a circuit diagram showing a detailed constitution, of the DC/DC converter 30.

The DC/DC converter 30 is a full bridge converter including a first arm connected between terminals of the battery 20; a second arm connected between terminals of the fuel cell 40; and a reactor L connected between the first arm and the second arm.

The first arm includes IGBT elements TR1, TR2 connected in series between the positive pole and the negative pole of the battery 20; and diodes D1, D2 connected in parallel to the IGBT elements TR1, TR2.

The collector of the IGBT element TR1 is connected to the positive pole of the battery 20, and the emitter thereof is connected to a node N1. The diode D1 is connected, assuming that a direction from the node N1 to the positive pole of the battery 20 is a forward direction.

The collector of the IGBT element TR2 is connected to the node N1, and the emitter thereof is connected to the negative pole of the battery 20. The diode D2 is connected, assuming that a direction from the negative pole of the battery 20 to the node N1 is a forward direction.

The second arm includes IGBT elements TR3, TR4 connected in series between the positive power source terminal and the negative power source terminal of the fuel cell 40; a diode D3 connected in parallel to the IGBT element TR3; and a diode D4 connected in parallel to the IGBT elements TR4.

The collector of the IGBT element TR3 is connected to the positive power source terminal of the fuel cell 40, and the emitter thereof is connected to a node N2. The diode D3 is connected, assuming that a direction from the node N2 to the positive power source terminal of the fuel cell 40 is a forward direction.

The collector of the IGBT element TR4 is connected to the node N2, and the emitter thereof is connected to the negative power source terminal of the fuel cell 40. The diode D4 is connected, assuming that a direction from the negative power source terminal of the fuel cell 40 to the node N2 is a forward direction. The reactor L is connected between the node N1 and the node N2.

According to such a constitution, a pressure rise and a pressure drop from the battery 20 side to the fuel cell 40 side are made possible, and a pressure rise and a pressure drop from the fuel cell 40 side to the battery 20 side are made possible.

Furthermore, the DC/DC converter 30 includes a DC-CPU 31. a dead time generating section 33 and a current sensor (measurement means) SE which detects a current (reactor current) IL of the reactor L.

The DC-CPU 31 outputs a signal GATEBA which is a reference of a switching duty ratio of the converter in response to the voltage instruction value Vfcr and the current value IL. The signal GATEBA is transmitted from the DC-CPU 31 to the dead time generating section 33.

The dead time generating section 33 delays a rise or a fall of an input signal to dispose a dead time in which both of two output signals are inactive during active periods of two complementary output signals. Here, if two IGBT elements which belong to the same arm are simultaneously turned on, an input power source short-circuits, and a large through current flows. A period which is disposed in order to prevent such a short-circuit and in which two IGBT elements belonging to the same arm are both turned off is referred to as a dead time. It is to be noted that the DC-CPU 31 is provided with a dead time correcting section 34 which corrects the dead time (details will be described later).

Figure 6:
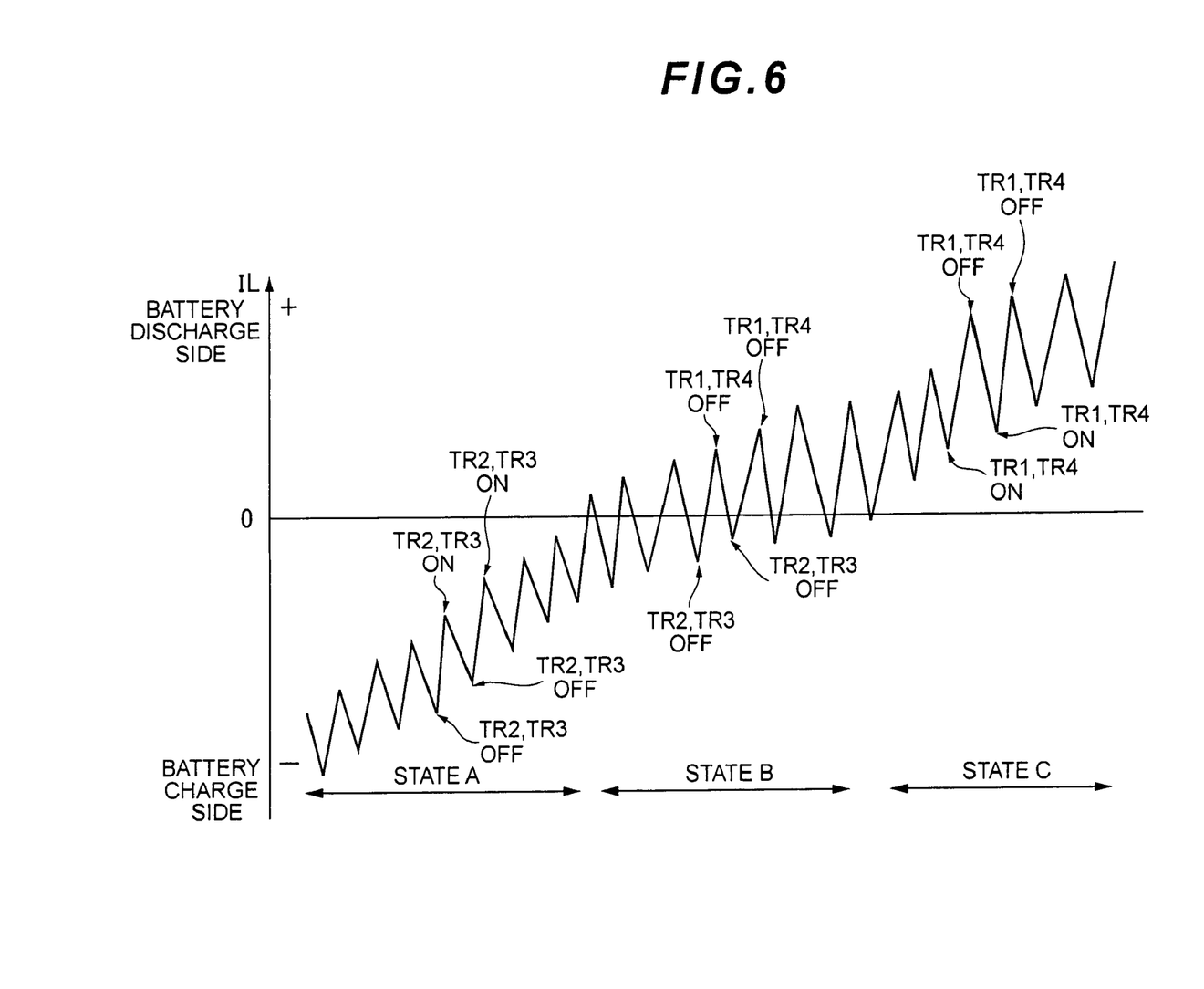
FIG. 6 is a diagram showing a relation between the reactor current and the DC/DC converter in the second embodiment.

FIG. 6 is a diagram showing a relation between the reactor current IL and the state of the DC/DC converter 30. It is to be noted that in the following description, it is assumed that a direction of the reactor current IL flowing from the battery 20 side to the fuel cell 40 side is positive (refer to arrows shown in FIG. 5).

State A is a state in which in one cycle of switching, a maximum value Imax of the reactor current IL satisfies the following formula (1). That is, the state A is a state in which the fuel cell 40 charges the battery 20 (battery charge state).

$$Imax<Ia1 \quad (1)$$

wherein Ia1; charge threshold value (<0).

State B is a state in which in one cycle of switching, the maximum value Imax and a minimum value Imin of the reactor current IL satisfy the following formulas (2) and (3), respectively. That is, the state B is a state in which a current to charge the battery 20 and a current discharged from the battery 20 are substantially antagonistic (battery output equilibrium state).

$$Ib1<Imin<Ib2 \quad (2)$$

$$Ib3<Imax<Ib4 \quad (3)$$

wherein Ib1; first equilibrium threshold value (<0)
Ib2; second equilibrium threshold value (<0)
Ib3; third equilibrium threshold value (>0)
Ib4; fourth equilibrium threshold value (>0)

State C is a state in which in one cycle of switching, the minimum value Imin of the reactor current IL satisfies the following formula (4). That is, the state C is a state in which electricity is discharged from the battery 20 to the fuel cell 40 (battery discharge state).

$$Ic1<Imin \quad (4)$$

wherein Id1; discharge threshold value (>0).

The response characteristic of the DC/DC converter 30 keeps its satisfactory state if the state is in any of the states A, B and C, but deteriorates during the transition between the states A, B and C (i.e., the maximum value Imax or the minimum value Imin of the reactor current IL does not satisfy any of the relations of the above formulas (1) to (4)).

To solve the problem, in the present embodiment, a relation between the reactor current IL and each state is obtained beforehand by an experiment or the like, the response characteristic map is prepared which indicates such a correspondence, and the map is stored in the memory 171 beforehand. The state detecting section 170 compares the reactor current IL detected by the current sensor SE with the response characteristic map to grasp the state of the DC/DC converter 30 at that time, and notifies the superimposed signal control section 160 of the state. It is to be noted that in the following description, the states A, B and C are referred to as the "stable state", and a state in which the transition from each stable state occurs is referred to as the "unstable state".

<State A; Battery Charge State>

Figure 7:
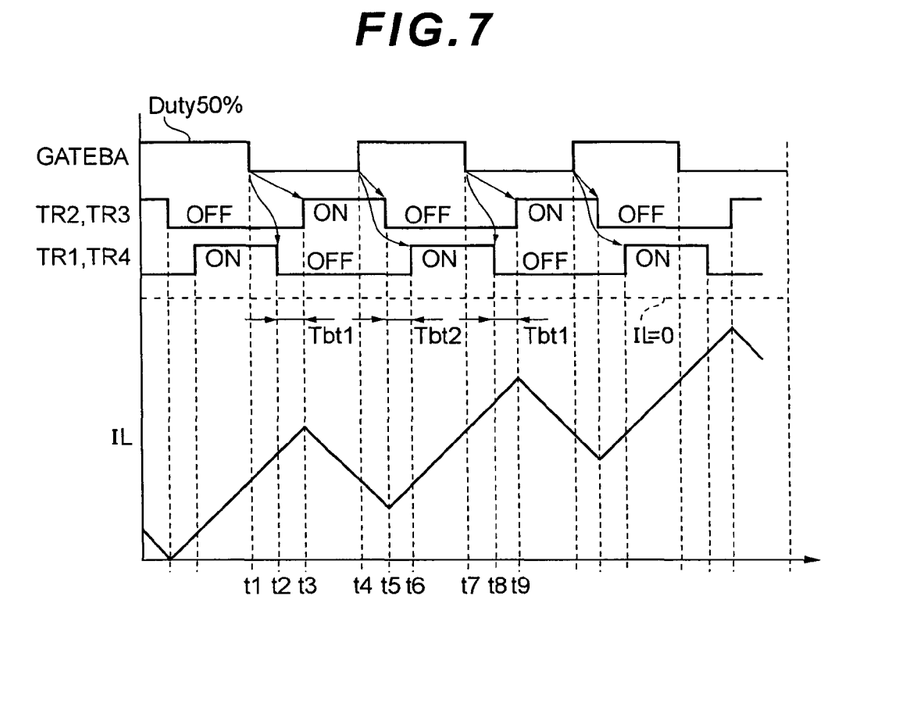
FIG. 7 is a diagram showing a relation between the reference signal and the reactor current in the state A in the second embodiment.

FIG. 7 is an operation waveform diagram showing a relation between the reference signal GATEBA and a change in the reactor current IL in the state A of FIG. 6.

As shown in FIG. 7, when the reference signal GATEBA falls at a time t1, the IGBT elements TR1, TR4 are inactivated from the on-state to the off-state at a time t2, and the IGBT elements TR2, TR3 are activated from the off-state to the on-state at a time t3 after a dead time Tbt1 has elapsed.

Subsequently, in response to a rise of the reference signal GATEBA at a time t4, the IGBT elements TR2, TR3 are inactivated from the on-state to the off-state at a time t5, and the IGBT elements TR1, TR4 are activated from the off-state to the on-state at a time t6 after a dead time Tbt2 has elapsed.

Here, the diodes D1 to D4 are connected to the IGBT elements TR1 to TR4 in parallel thereto, respectively. Therefore, even in the dead time, a current can flow in the forward direction of each diode.

In the state A, the reactor current IL is negative, that is, the reactor current IL flows from the node N2 to the node N1 in FIG. 5. Therefore, the diodes D1, D4 are electrically continuous in the dead time when all of the IGBT elements TR1 to TR4 are in the off-state, the reactor current IL increases during the time period from the time t5 to the time t9 in one cycle, and the time period when the reactor current decreases in one cycle is only the time period from the time t3 to the t5 when the IGBT elements TR2, TR3 are electrically continuous. Therefore, assuming that the duty ratio of the reference signal GATEBA is 50%, the reactor current IL tends to gradually increase in the state A.

<State B; Battery Output Equilibrium State>

Figure 8:
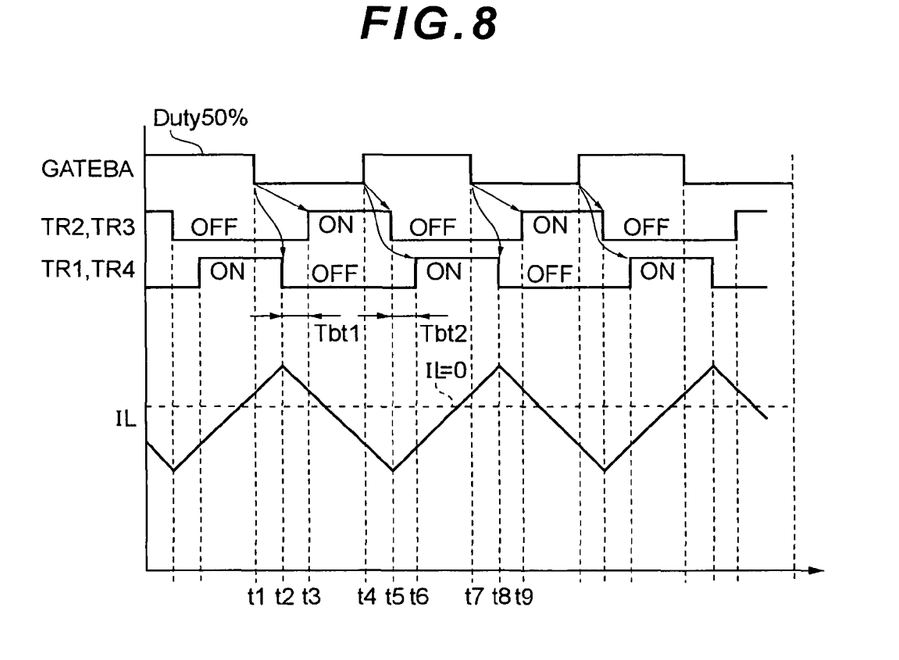
FIG. 8 is a diagram showing a relation between the reference signal and the reactor current in the state B in the second embodiment.

FIG. 8 is an operation waveform diagram showing a relation between the reference signal GATEBA and the change in the reactor current in the state B of FIG. 6.

Since the reference signal GATEBA and on/off states of IGBT elements TR1 to TR4 of FIG. 8 are similar to those of FIG. 7, description thereof is omitted.

In the state B, the time period in which the reactor current IL is positive, that is, the reactor current IL flows from the node N1 to the node N2 of FIG. 5 and the time period in which the reactor current IL is negative, that is, the reactor current IL flows from the node N1 to the node N2 of FIG. 5 are repeated.

In this case, for the time period obtained by adding the dead time Tbt1 to the time period from the time t3 to the time t4 when the IGBT elements TR2, TR3 are electrically continuous, that is, for the time period from the time t2 to the time t5, the reactor current IL decreases in one cycle, and for the time period obtained by adding the dead time Tbt2 to the time period from the time t6 to the time t8 when the IGBT elements TR1, TR4 are electrically continuous, that is, for the time period from the time t5 to the time t8, the reactor current IL increases in one cycle. Therefore, assuming that the duty ratio of the reference signal GATEBA is 50%, the present state of the reactor current IL tends to be maintained in the state B.

<State C; Battery Discharge State>

Figure 9:
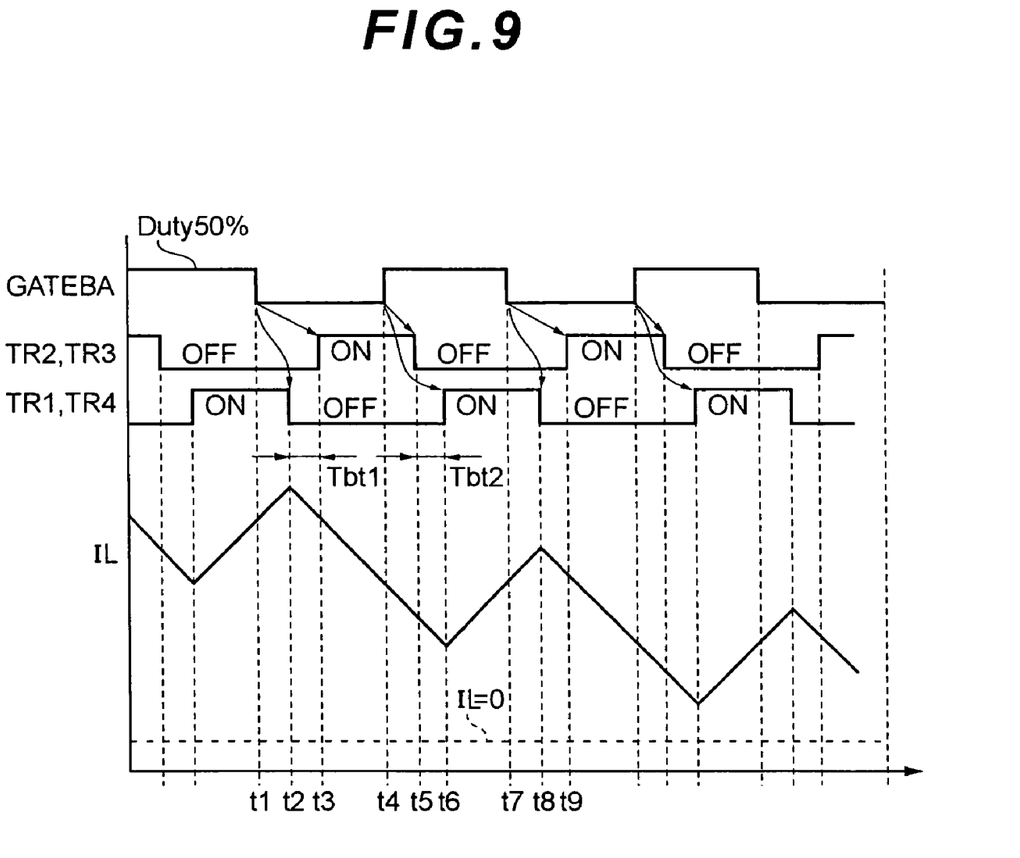
FIG. 9 is a diagram showing a relation between the reference signal and the reactor current in the state C in the second embodiment.

FIG. 9 is an operation waveform diagram showing a relation between the reference signal GATEBA and the change in the reactor current in a state C of FIG. 6.

Since the reference signal GATEBA and on/off states of IGBT elements TR1 to TR4 of FIG. 9 are similar to those of FIG. 7, description thereof is omitted.

In the state C, the reactor current IL is positive, that is, the reactor current IL flows from the node N1 to the node N2 of FIG. 5. Therefore, in the dead time when all of the IGBT elements TR1 to TR4 are in the off-state, the diodes D2, D3 are electrically continuous.

That is, for the time period obtained by adding the dead times Tbt1, Tbt2 to the time period from the time t3 to t4 when the IGBT elements TR2, TR3 are electrically continuous, that is, for the time period from the time t2 to the time t8, the reactor current IL decreases in one cycle, and the time period when the reactor current increases in one cycle is only the time period from the time t6 to the time t8 when the IGBT elements TR1, TR4 are electrically continuous.

Therefore, assuming that the duty ratio of the reference signal GATEBA is 50%, the reactor current IL tends to gradually decrease in the state C.

As described above with reference to FIGS. 7 to 10, the duty ratio of the reference signal GATEBA is different from the duty ratio by which the reactor current is actually increased or decreased with respect to the state of the reactor current, and therefore, in order to perform a control with a good precision, the duty ratio of the reference signal GATEBA needs to be corrected in accordance with the state of the reactor current.

Accordingly, in the present embodiment, the dead time correcting section 34 of the DC-CPU 31 (see FIG. 5) corrects the dead time. On receiving a detection result of the reactor current IL from the current sensor SE, the dead time correcting section 34 judges whether the DC/DC converter 30 is in the state A, B or C (stable state) or the state (unstable state) in which the transition from each stable state occurs. The dead time correcting section 34 selects a correction value of the duty ratio for the dead time corresponding to the judged state. Specifically, the dead time correcting section 34 selects a voltage value of −36 V as the correction value in the state A, selects 5.4 V in the state B, and selects 42.8 V in the state C, whereas a control is performed to gradually change the correction value in a case of the transition from the state A to the state B or in a case of the transition from the state B to the state C. The correction value selected in this manner is reflected in the reference signal GATEBA, and the reference signal GATEBA in which the correction value is reflected is output from the DC-CPU 31 to the dead time generating section 33.

In this manner, the state of the response characteristic of the DC/DC converter 30 is grasped from the reactor current IL and the response characteristic map, and the amplitude of the AC impedance measuring signal is controlled based on the grasped state, and thus a constantly accurate impedance measurement is made possible regardless of the response characteristic of the DC/DC converter 30.

C. Third Embodiment

In the above second embodiment, the amplitude of an AC impedance measuring signal is controlled to thereby measure the impedance, but instead of controlling the amplitude, an operation point of a system may be changed, and the impedance measurement may be performed with the changed operation point.

Figure 10:
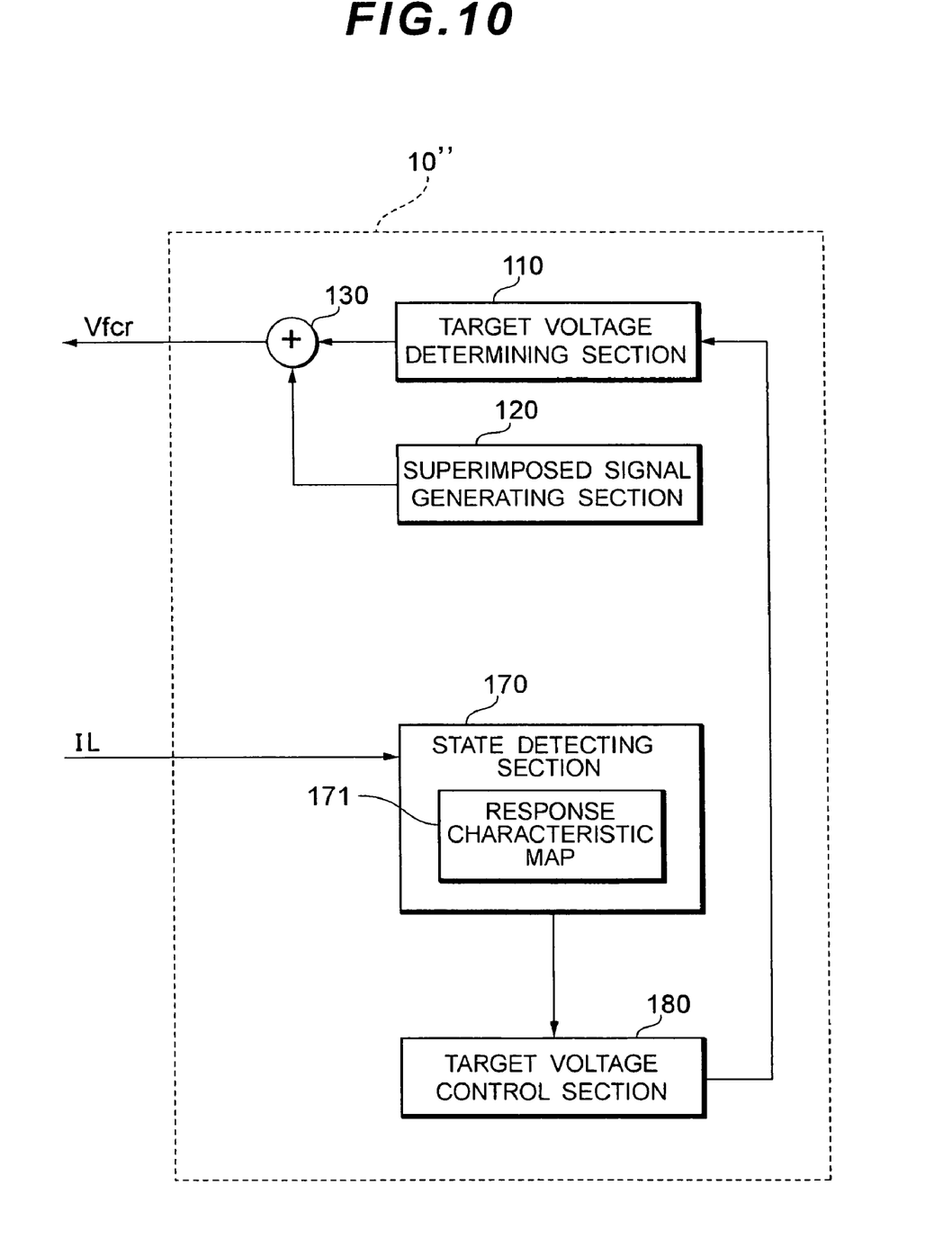
FIG. 10 is a diagram showing an impedance measurement in a third embodiment.

FIG. 10 is a diagram showing a constitution of functions of a control unit 10″ in a third embodiment. It is to be noted that components corresponding to those of the control unit 10′ shown in FIG. 4 are denoted with the same reference numerals, and detailed description thereof is omitted.

A target voltage control section (state control means) 180 controls an output target voltage determined by the target voltage determining section 110 based on a state of the DC/DC converter 30 notified by a state detecting section 170. In more detail, the target voltage control section 180 performs nothing, in a case where it is notified from the state detecting section 170 that the converter is in a stable state. On the other hand, when the target voltage control section 180 is notified of the unstable state by the state detecting section 170, a control is performed to increase (or decrease) the output target voltage so that the response characteristic of the DC/DC converter 30 transits from the unstable state to the stable state. When such a control is performed, the operation point of the system is changed, and the response characteristic of the DC/DC converter 30 transits from the unstable state to the stable state.

The output target voltage may thus be controlled to change the operation point of the system, and the impedance measurement may be performed in a case where the response characteristic of the DC/DC converter 30 is in the stable state.

It is to be noted that the fuel cell system of the present invention is not limited to a constitution shown in FIG. 1 in which the DC/DC converter 30 and the inverter 60 are connected to the output end of the fuel cell 40, and the battery 20 is connected to the output end of the DC/DC converter 30. For example, the system may be constituted so that the DC/DC converter 30 is connected to the output end of the fuel cell 40, and the inverter 60 and the battery 20 are connected to the output end of the DC/DC converter 30.

The invention claimed is:

1. A fuel cell system including:
    a fuel cell;
    an electric accumulator interposed in a discharge path of the fuel cell and connected in parallel to the fuel cell; and
    a DC/DC voltage converting device connected between the electric accumulator and the fuel cell, the DC/DC voltage converting device having a reactor;
    wherein the fuel cell system includes a control unit, the control unit further comprising:
    a voltage instruction signal generating section for superimposing an impedance measuring signal on an output target voltage of the DC/DC voltage converting device and outputting the voltage to the DC/DC voltage converting device, when an impedance of the fuel cell is measured by using an AC impedance method;
    a state detection section for judging a state of a response characteristic of the DC/DC voltage converting device during the impedance measurement;
    a superimposed signal control section programmed to control an amplitude of the impedance measuring signal based on the state of the response characteristic of the DC/DC voltage converting device judged by the state detection section,
    a measuring device for measuring a reactor current of the DC/DC voltage converting device; and
    a first storage device for storing a response characteristic map to judge from the reactor current of the DC/DC voltage converting device whether or not the response characteristic of the DC/DC voltage converting device is in a stable state; wherein
    the state detecting section compares a measurement result of the measurement device with the response characteristic map to judge the stable state of the response characteristic; and
    the superimposed signal control section programmed to perform a control so that the amplitude of the impedance measuring signal in a case where the response characteristic of the DC/DC voltage converting device is in an unstable state is larger than that of the impedance measuring signal in a case where the response characteristic of the DC/DC voltage converting device is in the stable state.

2. The fuel cell system according to claim 1, further comprising:
    a second storage device for storing an amplitude value of the impedance measuring signal in a case where the response characteristic is in the stable state and an amplitude value of the impedance measuring signal in a case where the response characteristic is in the unstable state;
    wherein the superimposed signal control section programmed to select, from the second storage device, the amplitude value of the impedance measuring signal in accordance with the state of the DC/DC voltage converting device, and controls the amplitude of the impedance measuring signal based on the selected amplitude value.

* * * * *